United States Patent [19]

Turner et al.

[11] Patent Number: 4,875,891
[45] Date of Patent: Oct. 24, 1989

[54] SEPARATING GRATE FOR A GRAIN HARVESTER

[75] Inventors: Reed J. Turner, East Moline, Ill.; Loren W. Peters, Bettendorf, Iowa; John E. Wilson, Coal Valley; Robert E. Bennett, Moline, both of Ill.

[73] Assignee: Deere & Company, Moline, Ill.

[21] Appl. No.: 229,784

[22] Filed: Aug. 5, 1988

Related U.S. Application Data

[63] Continuation of Ser. No. 22,293, Mar. 2, 1987, abandoned.

[51] Int. Cl.[4] .............................................. A01F 12/24
[52] U.S. Cl. .................................... 460/110; 460/108
[58] Field of Search ................ 209/394; 460/108, 110, 460/107, 109

[56] References Cited

U.S. PATENT DOCUMENTS

| 787,867 | 4/1905 | Von Wye | 209/394 |
|---|---|---|---|
| 873,719 | 12/1907 | Closz | 209/394 |
| 947,697 | 1/1910 | Hasch | 209/394 |
| 1,162,548 | 11/1915 | Barhorst | 460/99 |
| 1,191,853 | 7/1916 | Thompson | 460/84 |
| 1,269,109 | 6/1918 | Noack | 460/109 |
| 2,457,680 | 12/1948 | Johnson | 460/110 |
| 2,804,077 | 8/1937 | Anderson | 460/109 |
| 3,334,744 | 8/1967 | James et al. | 209/394 |
| 3,385,438 | 5/1968 | Fisher | 209/394 |
| 3,537,459 | 11/1970 | Thomas | 460/110 |
| 4,004,404 | 1/1977 | Rowland-Hill et al. | 460/110 |
| 4,511,466 | 4/1985 | Jones et al. | 209/394 |

Primary Examiner—Paul J. Hirsch

[57] ABSTRACT

In an axial flow rotary separator, a separator grate forming part of a generally cylindrical separator casing consists of a series of circumferentially spaced, axially extending, finger bar assemblies. In each finger bar assembly side by side fingers extend circumferentially in the direction of rotation, supported cantilever fashion by an axially extending finger support bar. The fingers and support bar inner surfaces all lie approximately in a cylindrical surface but the radial offset of the free ends of the fingers relative to the following finger support bar, may be chosen or varied according to the crop handled and the grate characteristics desired. In a second embodiment a threshing concave of the same general structure is used in conjunction with a conventional rasp bar threshing cylinder.

34 Claims, 5 Drawing Sheets

SEPARATING GRATE FOR A GRAIN HARVESTER

This application is a continuation of application Ser. No. 022,293, filed March 2, 1987 now abandoned.

BACKGROUND OF THE INVENTION

The invention concerns grain separation in a grain harvester and more particularly a foraminous separating grate or concave of the type which at least partially wraps a separator rotor or threshing cylinder, and cooperates with such rotating element to define a separating and/or threshing zone where crop material is processed and divided and grain and smaller fractions of the material pass through the foramina, typically to a cleaning shoe.

The individual openings (foramina) of the conventional separating grate or bar-type threshing concave are of slot or cell form, usually elongated in the circumferential direction. In one form, especially common as a threshing concave, the openings are defined by spaced apart axially extending bars through which circumferentially extending wires or rods are threaded to create a series of rectangular slots or cells. In another form, common in axial form rotary separators, the foramina are oval or rectangular slots punched in a sheet metal portion of a cylindrical separator casing surrounding a rotor.

In the operation of threshing and separating devices having concaves or grates with rectangular or oval slots of limited circumferential extent, the rotating element [threshing cylinder or separating rotor] impels or drags crop materials circumferentially over the foraminous surface and the rotationally downstream end of a slot acts as a barrier or dead end with respect to flow of some of the material. This general configuration of grate or concave is structurally convenient and the interruptions in the slots or openings contribute to the separating or threshing function by providing a series of spaced working surfaces or impedances. However, in some operating conditions, particularly when crop moisture is high, the impedance becomes too great and material begins to hairpin or mat over the grate structure [and the rotor is unable to keep the grate clear]. In corn harvesting for example, stalks, leaves or silks, hairpin or paste over the slot walls [or rods in a conventional bar concave], and ends until the openings are plugged. In dry conditions crop material may lay as a mat on top of the concave rods and retard flow of grain through the grate.

In separating grates and threshing concaves, grid or cell opening geometry is a compromise between achieving desired separating efficiency and avoiding choking or plugging. The problem of plugging cannot be solved by making the grate apertures larger. Desired separation level would be lost and too much coarse material would go through to the cleaning shoe.

Thompson, in U.S. Pat. No. 1,191,953, discloses a threshing and separating concave for use with a spike tooth threshing cylinder in which adjustably reclining peg teeth emerge from slots between circumferential grate bars. The grate bars are supported and spaced by cross bar members whose inverted triangular cross-section, Thompson claims, helps prevent their collecting material. He claims that his grate design is virtually unpluggable, but the basic form is still a rectangular cell with potential for collecting material by wrapping or hairpinning especially at the closed end of the cells defined by the cross bars.

Landis, in U.S. Pat. No. 959,561 claims to have reduced the possibility of blockage in a purely separating grate by creating a two surface arrangement in which a radially inner surface of substantially continuous circumferential vanes supports straw away from contact with any transverse member. But of course in this arrangement the functional contribution of transverse members in the threshing or separating surface is missing. And, even though the transverse members are offset considerably below (radially outwards) the circumferential vanes it is still possible for them to collect material and develop a blockage.

SUMMARY OF THE INVENTION

Accordingly, an object of the invention is to provide for a grain harvester a threshing concave or separating grate generally of the cell type, including functionally significant elements transverse to the direction of material flow, and having threshing and separating characteristics similar to those of conventional cell type concaves or grates, but modified so as to reduce grate blockage from accumulations of crop material in and on the structure.

It is a particular object to provide a separating grate for an axial flow rotary separator which, in cooperation with a suitable rotor, is capable of handling a wide variety of types and condition of crop material, smoothly and without plugging.

According to the invention, in a concave or grate having generally rectangular cells defined by rotationally upstream and downstream walls or members and by spaced apart circumferentially extending side members, all lying approximately in a common arcuate surface, at least some of the side members are interrupted adjacent their downstream ends and adjacent the downstream cell walls so as to provide opportunity for lateral release of material and movement of material along and against the downstream walls. Crop material may exit or migrate laterally from the cell, allowing bunches of material to dissipate. The opportunity for lateral movement of crop material at the closed end of a cell, as for example against a transverse bar of a conventional bar type threshing concave, makes the separator less sensitive to variations or unevenness in crop material feeding or in crop material condition.

In a preferred form of the invention, the separating or threshing surface is defined by a series of spaced apart finger bar assemblies transverse to the direction of crop material flow. In each, a support bar carries a series of spaced apart fingers or teeth extending generally in a downstream circumferential direction. Each finger or tooth ends somewhat upstream of the succeeding transverse bar assembly so as to define a generally radially extending opening between successive finger bar assemblies. When a comb-like bar, with fingers or teeth, is used as the principle element in a separating or threshing grate, manufacturing cost is potentially reduced compared with, for example, a conventional bar-type threshing concave in which rods must be threaded through holes punched in relatively thick threshing bars.

Adjustments in the character of the internal working surface of the grate of concave may readily be made to enhance performance in particular threshing or separating applications. For example, in a separator application, each finger bar assembly may be disposed so that the fingers extend rotationally downstream and are angled inwards towards the separator rotor. This "exposes" the ends of the fingers somewhat, making it easier for them to shed any hairpinned material. And the step-down or "shingled" effect encountered by crop material as it is propelled by a rotor from one finger bar assembly onto the next may enhance separation efficiency.

In keeping with the invention, cantilevered fingers in a separator finger bar assembly may be made resilient, or the assembly itself may be resiliently mounted, so that fingers or teeth may yield in conditions of uneven and heavy feeding to allow a slug of material to pass and reduce the possibility of plugging or choking the separator.

In a threshing concave application, fingers or teeth of axially extending concave bar assemblies may be angled somewhat outwards relative to the threshing cylinder. In this way the upstream edge or surface of each succeeding bar assembly is exposed, as is required for impacting or rubbing of crop material to achieve efficient threshing. At the same time, at least the upstream portions of the fingers or teeth may be maintained radially relatively close to the threshing cylinder, effectively reducing the depth of "pockets" in which material may collect and plug and improving the wiping action of the cylinder with respect to the concave. These modifications - angling the fingers or teeth radially inwards or outwards - create variations in the working surface but, collectively, the successive bar assemblies still define essentially a continuous arcuate working surface of limited radial variation.

DESCRIPTION OF THE PREFERRED EMBODIMENT

Figure 1:
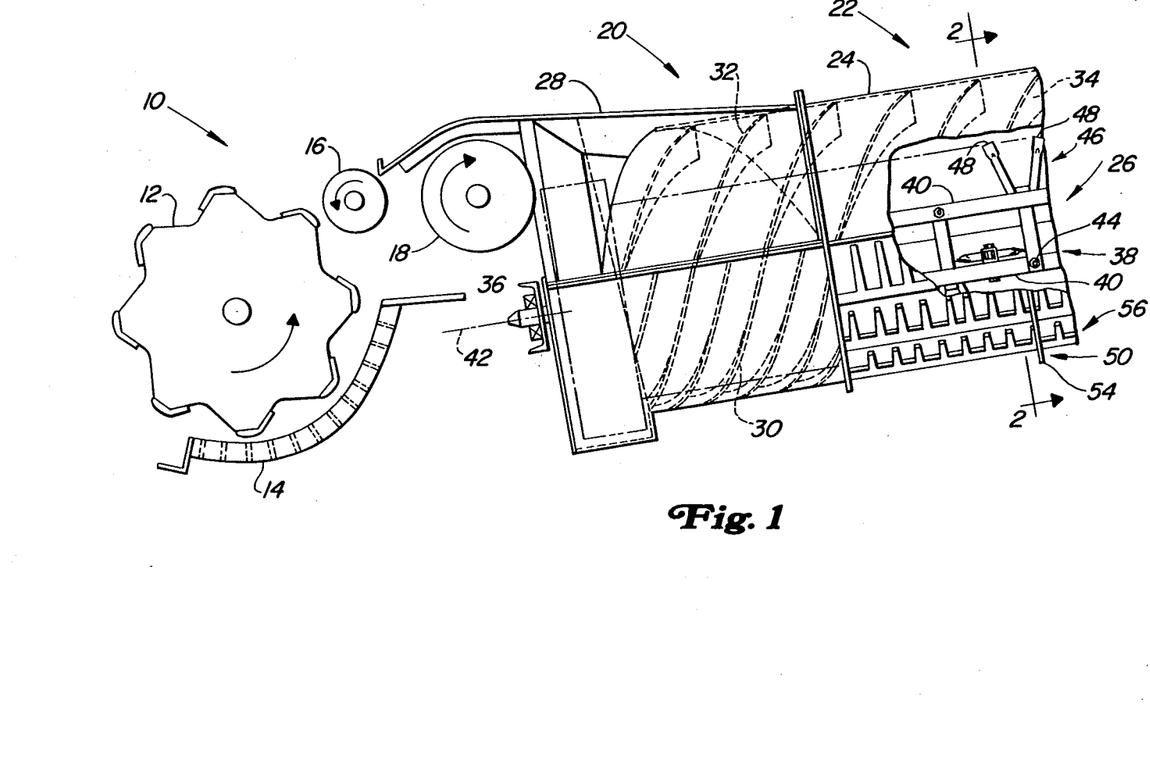
FIG. 1 is a somewhat schematic left-hand side elevation of the threshing section and an upstream portion of the twin rotor axial flow rotary separating section of a combine harvester embodying the invention.

The invention is embodied in a combine harvester, portions of the principal functional units of which are shown in FIG. 1. In the following description, designations of left and right are as they would be sensed by a person standing behind the combine and looking in the direction of travel. Harvested crop material is received by the threshing section 10 where a conventional threshing cylinder 12 and concave 14 cooperate to thresh and begin the separation of the harvested material. Grain and other small fractions pass downwards through the concave 14 to a cleaning shoe [not shown], while straw and remaining unseparated grain are delivered rearwardly and, guided by stripper 16 and beater 18, into a separator feed section 20 for feeding to the separator proper 22. The casing or housing 24 of the separator house a pair of separator rotors 26 which extend forward into the feed housing 28. In the feed housing 28, the rotors 26 receive a generally rearwardly directed stream of material from the beater 18 and divide and form it into an annular mat for propulsion downstream in a generally spiral path in contact respectively with the walls of the feed housing 28 and of the twin halves of the separator casing 24. The downstream indexing or propulsion of the crop material depends on generally helical guide vanes 30, 32 in the feed housing 28 and guide vanes 34 in the separator casing 24.

The rotors 26 and separator casing halves 24 are identical except for being opposite left and right hand and only the left side need be described. Rotor 26 is journaled at its forward end in bearing 36. An open frame or core assembly 38, includes four longitudinal frame members 40 symmetrically spaced about the rotor axis 42. The rotor frame members 40 pivotably support, at pivots 44, a plurality of crop engaging elements or fingers 46, each including a pair of crop engaging portions 48, free to be deflected in a fore and aft direction by virtue of the pivot 44. A threshing and separating arrangement of this general type is described in more detail in copending U.S. patent application Ser. Nos. 861,467 and 861,468, both filed May 9, 1986 and assigned to the assignee of the present invention.

Figure 2:
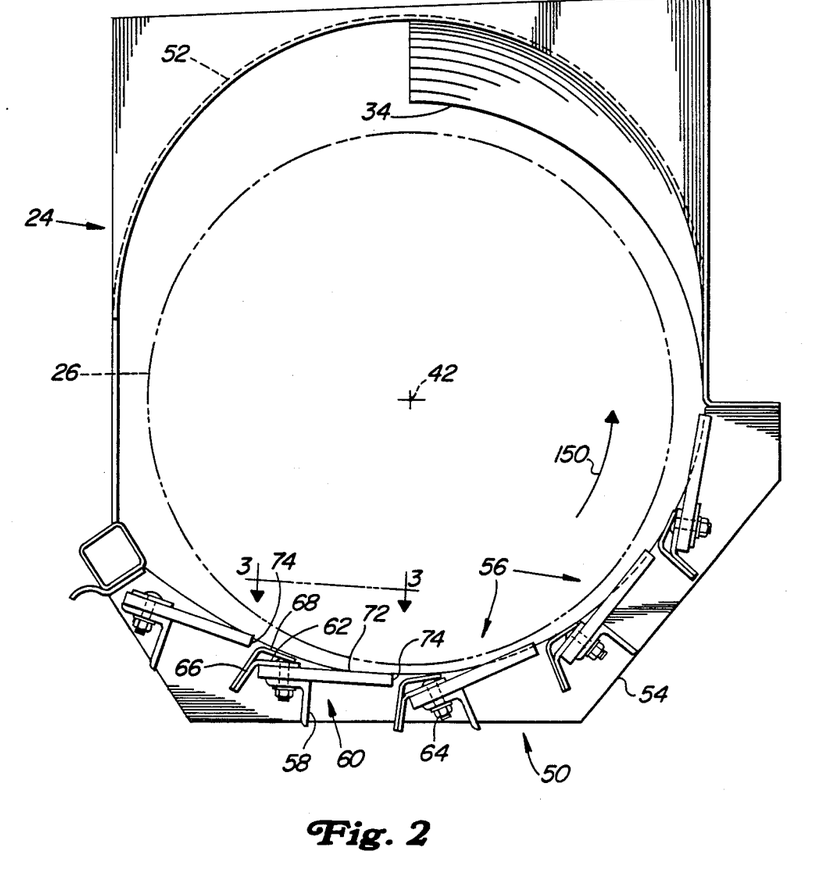
FIG. 2 is an enlarged cross sectional view taken approximately on line 2—2 of FIG. 1 of the left-hand portion of the separator.
Figure 3:
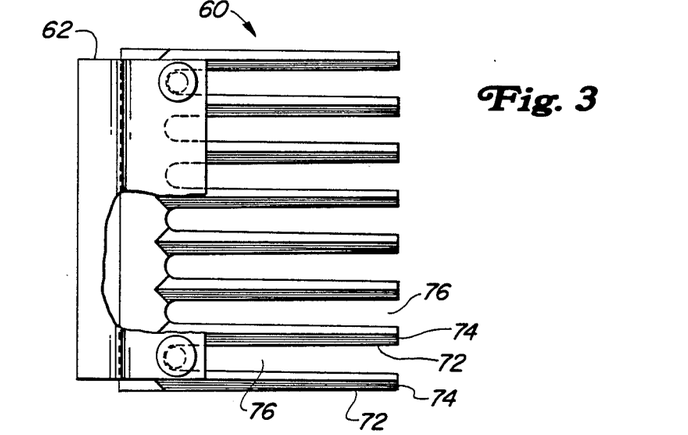
FIG. 3 is a further enlarged partial view taken approximately on line 3—3 of FIG. 2, showing a portion of a separator finger bar assembly.

The invention particularly concerns the separator portion 22, the left-hand portion of which is shown in cross section in some detail in FIG. 2. The rotor axis 42 is offset downwards so that the rotor tine crop engaging portions 48 sweep closely above a separating grate assembly 50 comprising a bottom portion of the separator casing 24. The upper portion of the casing 52 is imperforate sheet metal and supports the separator guide vanes 34. In the grate assembly 50, longitudinally spaced bulkheads 54 support a series of five finger bar assemblies in closely spaced circumferential array. In each finger bar assembly 56 (as seen also in FIG. 5) a support angle 58 provides structural and cantilevered support for a plurality of plastic separator finger groups 60 extending rotationally downstream from the support angle 58 and clamped in position by an axially extending clamp plate 62 and suitable hardware 64. An upstream deflector leg 66 of the clamp plate 62 extends generally radially but somewhat upstream. A cover 68 establishes a profile or bead 70 at the rotationally upstream end of the finger groups 60. Detail of a typical finger group 60 is shown in FIG. 3. The comb-like plastic structure includes a plurality of fingers 72, cantilevered and with functional tips 74, and spaces 76 between the fingers.

Figure 5:
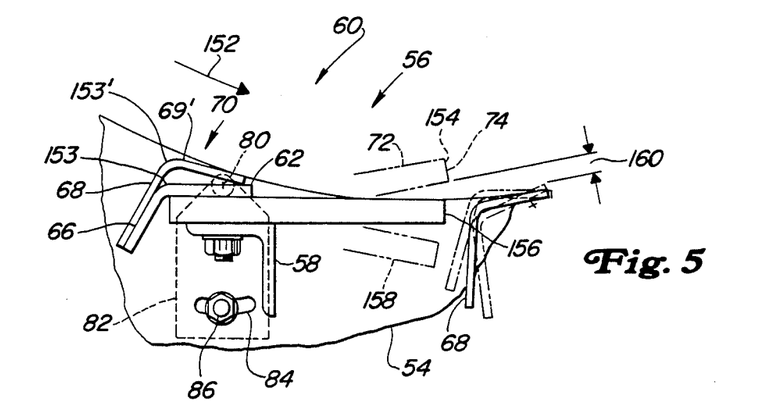
FIG. 5 shows an adjustment arrangement for a finger bar assembly.

As shown in FIG. 5, each finger bar assembly 56 may be made rotationally adjustable about a pivot axis 80 extending parallel to the rotor axis 42. A clamping lug 82 rigidly attached to the finger bar assembly is releasably and adjustably clamped to the one of grate assembly bulkheads 54 by means of slot 84 and suitable clamping hardware 86.

Figure 6:
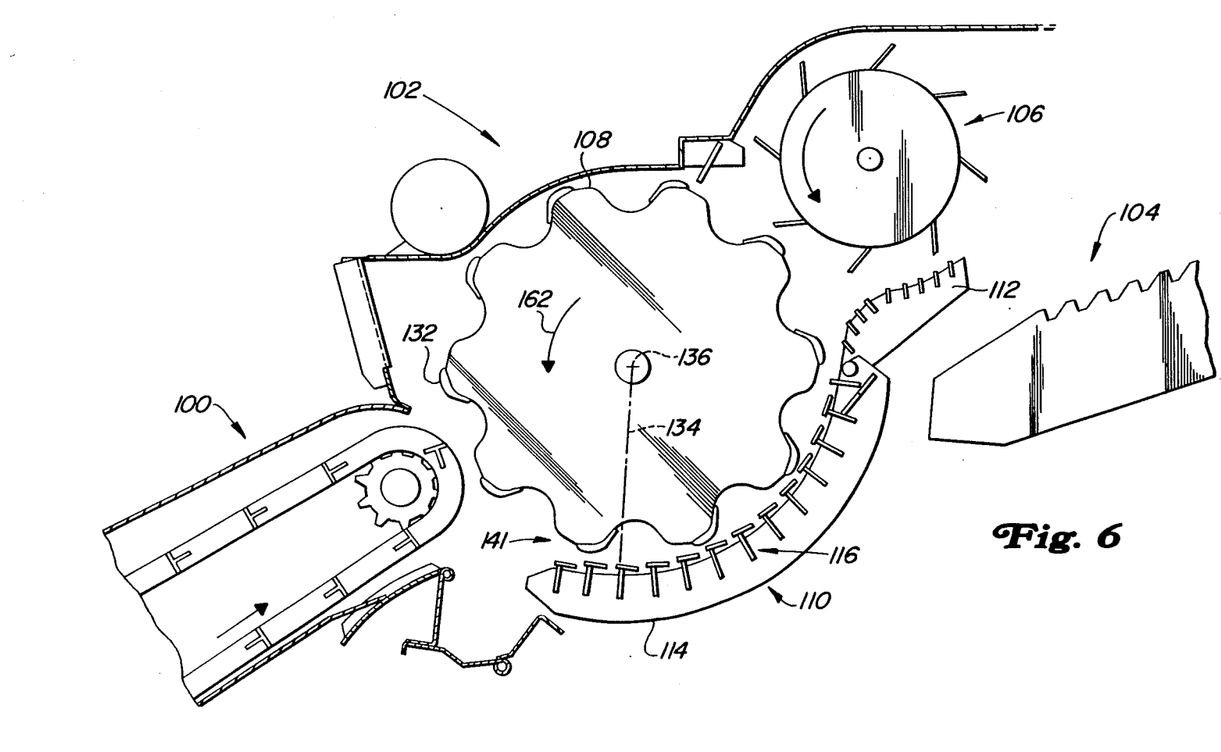
FIG. 6 is a view, somewhat similar to FIG. 1, of the threshing section and portions of the feed and separator sections of a combine harvester having an alternative embodiment of the invention.

FIG. 6 illustrates an alternative application of the invention. The environment is generally that of a so-called conventional combine in which a feeder conveyor 100 delivers gathered or harvested crop material to a threshing section 102 which, in turn, delivers straw and unseparated grain to a bank of straw walkers 104 for further separation, the delivery being assisted by beater 106. The threshing section 102 comprises a conventional rasp bar cylinder 108, cooperating with a concave 110 which partially wraps the cylinder and which, although generally conventional in overall form and shape, is constructed in accordance with the invention. A concave extension or beater grate 112 is conventional.

Figure 7:
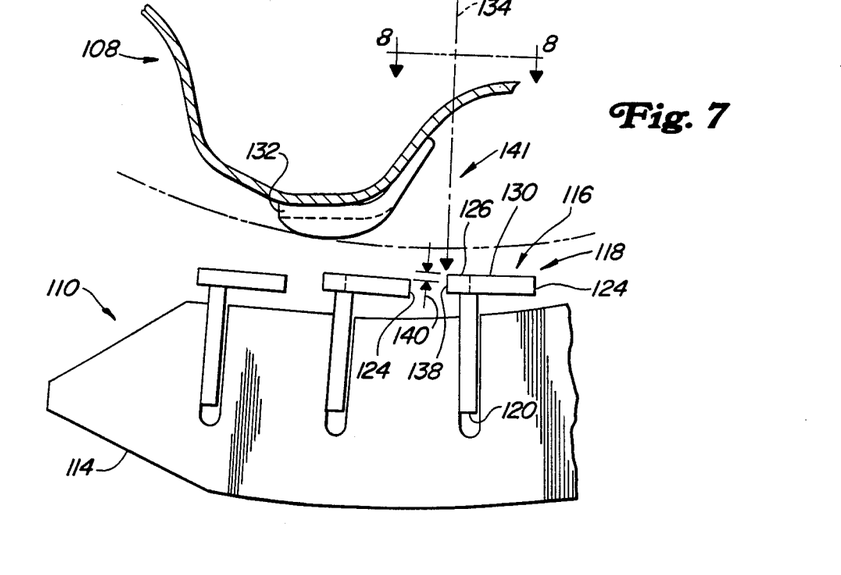
FIG. 7 is an enlarged partial view taken from FIG. 6 showing details of the threshing concave and cylinder.
Figure 8:
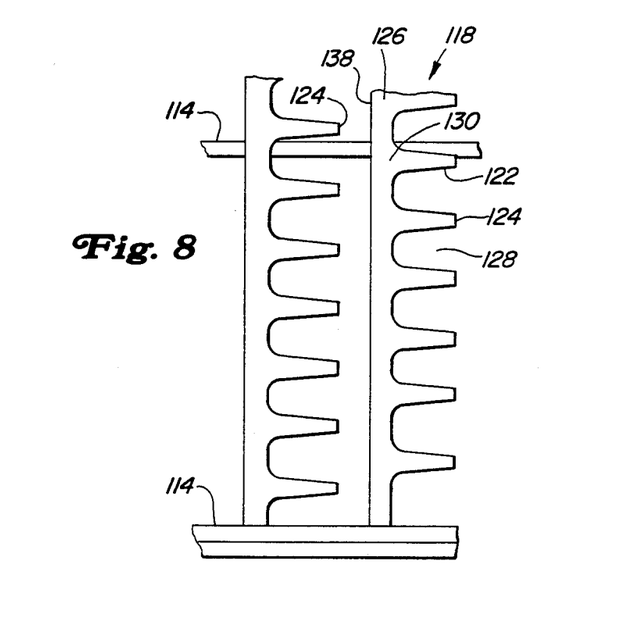
FIG. 8 is a partial view taken approximately on line 8—8 of FIG. 7 showing the form of the concave bar assemblies of the alternative embodiment.

In the concave assembly 110, shown in more detail in FIGS. 7 and 8, axially spaced arcuate bulkheads or support bars 114 support a series of finger bar assemblies 116, closely spaced in circumferential array. In each finger bar assembly 116, a finger or concave bar 118 is supported and reinforced by a finger bar support 120, in turn supported by the bulkheads 114 of the concave assembly. Each finger or concave bar 118 is in the form of an elongated comb in which short fingers or teeth 122 extend rotationally downstream, terminating in a finger or tooth tip 124 closely adjacent the spine or bar 126 of the adjacent downstream finger bar. Notches or spaces 128 separate the fingers 122.

Although details are not shown, the concave assembly 110 is conventionally adjustable to vary the radial clearance between it and the cylinder 108. As shown in FIG. 6, the arcuate concave surface defined collectively by the inner faces 130 of the fingers 118 is approximately concentric with the cylinder 108 and is closely swept by the cylinder rasp bars 132 although, as is conventional, clearances may be somewhat greater at the entry to the concave.

Each finger bar assembly 116 is disposed so that the inner surfaces 130 of the finger bar are approximately tangential to the cylinder generated by the rotation of the threshing cylinder 108. More precisely, and as indicated in FIG. 7, each surface 130 is perpendicular to a radial line such as line 134 extending from the center 136 of the threshing cylinder and passing through the leading or upstream edge 138 of the finger bar 118. This disposition creates a stepped or washboard-like surface in which at least a portion of the leading edge 138 of the finger bar is exposed [as indicated at 140 in FIG. 7], for direct impact by crop material passing circumferentially in the material processing zone 141 between threshing cylinder and concave.

In the operation of the embodiment shown in FIGS. 1 to 5, crop material such as corn or small grain is gathered by conventional means, not shown, and delivered to the portion of the combine commonly called the separator, and including in this case the threshing, infeed and separator sections 10, 20 and 22 respectively. Treatment of the crop material in the threshing section 10 is generally conventional and results in a portion of the crop material, principally straw and unseparated grain, being conveyed through the infeed section 20 and propelled into the separator section 22 as an annular mat of crop material, generally in contact with the walls of the separator casing 24 and moving axially downstream in a generally spiral path, propelled circumferentially by the rotor 26 and urged downstream by the guide vanes 34. The material is thus propelled in a mat over the surface of the grate 50 in the direction indicated by the arrows 150, 152 in FIGS. 2 and 5 respectively. In each pass over the grate, separation of grain and other small fractions of the material takes place through a combination of the effects of centrifugal force and agitation of the material, due to the nature of the surface of the grate, including friction and irregularities. Grain and other small fractions passes radially outwards through the spaces or cells 76 between the fingers 72 for delivery to a cleaning shoe [not shown in the drawings]. Any material which hairpins on or partially wraps one of the fingers 72 is drawn along the finger to be freed at the space between the fingertip 74 and the finger cover 68. The material is then free, according to its shape, size and length, to continue its circumferential path within the separator or to pass generally radially outwards and be delivered to the cleaning shoe with the separated grain. The radially inner or top surface 69 of the finger cover member 68 [or the corresponding surface 69' of the clamp plate 62, if cover 68 is not used] is sufficiently broad in a circumferential direction to discourage hairpinning so that material readily passes circumferentially downstream to continue the separating process. Flow of material is also assisted by the rounded corners 153 on the covers 68 [or 153' on clamp plate 62 if the cover 68 is not used]. The deflector legs 66 are inclined somewhat forwardly of the radial [with respect to the rotor center 42] so that any crop material tending to pass between the fingers 72 and encountering the inclined deflector surface 66 is at least partially guided back into the interior of the separator.

In many crop and operating conditions, substantially blockagefree operation with good separating efficiency is obtained with "elevation" or inward angling of the fingers 72, as indicated by the somewhat exaggerated position 154 in FIG. 5. In this position there is not only a circumferential gap between the fingertip 74 and the finger cover 68, but also radial separation 160, so that the self cleaning characteristic of the rotationally downstream cantilevered finger is enhanced. If necessary for strength, web-like fingers of deeper cross section could be used without significantly affecting function. But for separating efficiency, the openness of the cells 76 (between the fingers) must be maintained and there must be the equivalent of the free end 74 to allow material to shed from the comb-like surface.

In more easily handled crops, a lower elevation, or even neutral position of the finger as indicated at 156 in FIG. 5 gives good results and, because the inner surface of the grate is effectively smoother, the separator may consume less power in operation.

The separator grate surface may be made more aggressive by "depressing" the fingers 72 or angling them outwards in the direction indicated by 158 in FIG. 5. This exposes the finger cover 68 to direct impact by crop material as it is propelled in the direction shown by the arrow 152 in FIG. 5. This configuration provides more agitation for the crop material and, if rotor speeds are high enough, opportunity for some secondary threshing due to impact on the finger cover 68.

Figure 4:
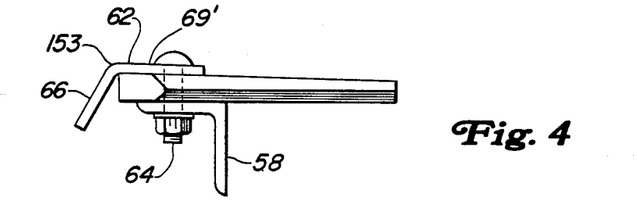
FIG. 4 is an end view of a modified finger bar assembly.

As seen best in FIG. 2 the bead form provided by use of the finger cover member 68 in combination with the exposed fingers 72 produces an effective concavity in the inner surface of the finger bar assembly 56, so that the grate assembly 50 as a whole conforms more closely to a cylindrical or arcuate surface. Alternatively, the fingers themselves may be curved (not shown) to approximate the cylindrical surface. For a particular orientation of the fingers 72 the use of the cover 68 softens the grate's characteristics but it may optionally be removed as indicated in FIG. 4.

For efficient separation, finger (and hence cell) length must be limited so that an excessive amount of straw does not pass outwards between the fingers to the cleaning shoe. The periodic encounter of crop material with the finger support bar structure (particularly cover 68 or clamp plate 62) helps to contain it within the separator housing so that separation can continue. For example, good results have been obtained in separators of about 24 inches housing diameter when each finger bar assembly spans about 30 degrees of arc. The circumferential span of the finger support assemblies (especially inner surfaces 69, 69') should generally be not less than about 1 3/8 inches.

The relatively smooth, low friction surface of the separator grate of the first embodiment makes it particularly compatible with an eccentrically mounted tined rotor (as shown in FIGS. 1 and 2) which, in operation, intermittently penetrates and positively propels the crop material mat. But a grate according to the invention may also be used to advantages in a more conventional axial flow rotary separator having a concentrically mounted rotor with fixed crop material engaging elements.

A further advantage of a separator grate of the first embodiment is that, compared with punched sheet metal and other conventional grates, grain damage is reduced. There are no sharp edges, and when the fingers are angled inwards there are a minimum of surfaces for grain to impact upon. Resilient construction of fingers or of the finger bar mounting also contribute to gentle handling of material.

In the operation of the second embodiment, covered by FIGS. 6 to 8, as the harvester advances over a field, crop material is gathered conventionally by means not shown and delivered through the feeder conveyor 100 [FIG. 6] to the threshing section 102. There the threshing cylinder 108 rotating in the conventional direction as indicated by arrow 162, cooperates with the concave 110 to thresh and begin separation of the material in the material processing zone 141 between them. The bulk of the threshed grain and other small fractions passes through the concave 110 for delivery to a cleaning shoe [not shown] while straw is discharged rearwardly over the beater grate 112 assisted by the beater 106 and delivered to the straw walker 104, where additional separation of grain takes place.

The major functional portion of the concave assembly 110 consists of the arcuate array of circumferentially spaced axially extending finger bar assembly 116 which, at least in part, duplicate functions of the time-proven conventional bar-type concave. The relative depression or angling outwards of the inner surfaces 130 of the finger bars or combs 118 exposes the leading edge 138 of the finger bar [see 140 in FIG. 7], providing an adequate area or surface for the threshing by impact which accounts for a major portion of the threshing in a conventional rasp-bar cylinder/bar-concave threshing combination. The edges 138 also serve as deflecting surfaces, diverting grain outwards through the concave for maximum separation. At the same time, in this concave according to the invention, the necessary open cell-like structure required for a separation is retained [spaces 128 between the teeth or fingers 122]. However, the circumferential gap between the fingertips 124 and the upstream edge 138 of the immediately downstream finger bar 118 provides for each cell, escape slots from the cell and opportunity for any material tending to bunch up or hang up on the leading edge 138 of the finger bar to move or migrate laterally and avoid accumulations of material sufficient to cause blocking or plugging of the concave. Avoidance of efficiency-reducing build up of material on the surface of the concave is also helped by the proximity of the circumferentially upstream portion of the inner surface 130 of the finger bar 118, to the threshing cylinder 108, so that each rasp bar 132 sweeps close to the finger bar surface helping to keep the grate or concave clean. This proximity also provides additional rubbing surface compared with a conventional bar type concave with the potential for enhancing threshing capacity Compared with the conventional bar type concave, threshing concaves according to the invention [110 in FIG. 6], are potentially lower in manufacturing cost. In parts fabrication, the punching of relatively small holes in heavy bars is avoided and in assembly, the labor intensive operation of threading the concave rods or wires through the holes of the bars is also eliminated.

In both both embodiments described above and in general, concaves or grates according to the invention have an important advantage over conventional concaves and grates. Any crop material that would tend to "hairpin" on the circumferentially extending rods or wires of a conventional structure, loses its support at the free ends of the finger-like elements of a structure according to the invention, so that the crop material, according to its and nature, might migrate radially outwards through the generally radially extending gap between the ends of the fingers and the next finger bar or comb, or it may move laterally to reduce bunching and assist in self cleaning, or it may be drawn radially inwards over the "threshold" of the next finger bar backing member, and be free to continue its downstream circumferential movement propelled by rotor or cylinder.

In grates or concaves according to the invention both the upstream back or support bar portion of the finger bar or comb and the fingers themselves are active in an arcuate surface, cooperating in supporting and processing a circumferentially moving mat or material in substantially a single layer or activity. The grate or concave which, functionally, is defined entirely by the circumferentially spaced array of finger bars or combs may be assembled or adjusted to suit particular crop applications and operations such as separating or threshing or a combination of the two. Each finger bar or finger bar assembly comprises a module of the grate or concave. As modules they may be assembled or adjusted for different relative angularities and, if desired, they may be offset laterally so that the fingers and the cell-like spaces between them [128] may be staggered as shown in FIG. 8 for a modification of the grate surface character.

We claim:

1. In a crop material separator in which a rotor having an axis and direction of rotation about the axis is at least partially wrapped by a concave so as to define a crop material processing zone between the concave and the rotor, the concave having a generally arcuate internal surface and comprising:

an array of circumferentially spaced, axially extending finger bar assemblies, each assembly including a plurality of generally circumferentially downstream extending fingers each having a finger tip and all fingers of a given assembly extending in the same general direction, the finger bar assemblies together defining the generally arcuate internal surface of the concave, and each finger bar assembly lying generally within the arcuate surface, but at least some of the finger bar assemblies being angled with respect to the arcuate surface so that, also with respect to the arcuate surface, the finger tips of the fingers of said some of the finger bar assemblies are radially offset with respect to the opposite ends of said fingers and said fingertips are spaced from the finger bar assembly immediately downstream of it.

2. The concave of claim 1 wherein, in terms of the direction of rotation, said some of the finger bar assemblies are angled inwards relative to the arcuate surface.

3. The concave of claim 2 wherein the angling of said some of the finger bar assemblies relative to the arcuate surface results in a radially outward step between successive finger bar assemblies and further including cover means carried by each finger bar assembly for effectively reducing the amount of the step so that the inner surface of the concave conforms more closely to the overall arcuate surface defined by it.

4. (Twice amended) The concave of claim 1 wherein in terms of the direction of rotation, said some of the finger bar assemblies are angled outwards.

5. The concave of claim 1 wherein the fingers of the at least some of the finger bar assemblies are tangential to the arcuate surface adjacent their upstream ends, so that, in terms of the direction of rotation, there is a step radially inwards from one finger bar assembly to the next.

6. The concave of claim 1 wherein each finger bar assembly includes an axially extending finger support member having an inner surface, substantialy coplanar with the fingers of that assembly and the fingers extend rotationally downstream from the finger support member.

7. The concave of claim 6 wherein the circumferential width of the inner surface of the finger support member is not less than about 1 inch inches.

8. The concave of claim 6 wherein there is a circumferential gap between the downstream tips of the fingers and the finger support member immediately downstream.

9. The concave of claim 6 wherein the downstream tips of the fingers are offset radially from the finger support member immediately downstream.

10. THe concave of claim 6 wherein the fingers are supported cantilever fashion by the finger support member.

11. The concave of claim 10 wherein the fingers are resilient and are deflectable responsive to radially outward loading.

12. The concave of claim 1 wherein there is a circumferential gap between the downstream tips of the fingers and the immediately downstream adjacent finger bar assembly.

13. The concave of claim 1, and further including means for adjusting the angle of the finger bar assemblies relative to the arcuate surface.

14. In a crop material separator in which a rotor having an axis of rotation is at least partially wrapped by a concave having a generally arcuate internal surface so as to define a crop material processing zone between the concave and the rotor, the concave comprising:
an array of circumferentially spaced, axially extending finger bar assemblies each including an axially extending finger support bar, and a plurality of generally circumferentially downstream extending fingers each having a tip and supported cantilever fashion by the support bar and all fingers of a given assembly extending in the same general direction, the finger bar assemblies collectively defining the arcuate concave internal surface and each finger support bar and finger laying approximately within that arcuate surface and the tip of each finger being spaced from the support bar immediately downstream of the respective finger.

15. The concave of claim 14 wherein the fingers are resiliently deflectable outwards with respect to the arcuate surface.

16. The concave of claim 14 wherein at least one of the finger bar assemblies is releasably supported for rotational adjustment about a axis approximately parallel to the axis of rotation of the rotor, so that the angle of inclination of the fingers relative to the arcuate surface may be adjusted.

17. An axial flow rotary separator having a generally cylindrical housing within which an axially extending rotor rotates and propels crop material spirally downstream as an annular mat generally in contact with the housing, the housing including at least one separating grate at least in part axially overlapping the rotor, characterized in that:
the grate comprises a plurality of axially extending finger bar assemblies in each of which a plurality of side by side fingers is supported cantilever fashion and extending rationally downstream, and the finger bar assemblies are disposed so that between the downstream tips of the fingers and the immediately adjacent downstream finger bar assembly, there is a gap of significant circumferential extent and so that all fingers of a given finger bar assembly are substantially coplanar and extend in the downstream direction.

18. The axial flow rotary separator of claim 17 wherein the grate is disposed in a lower portion of the generally cylindrical housing and the rotor is disposed eccentrically downwards towards the grate.

19. The axial flow rotary separator of claim 17 wherein the finger bar assemblies are disposed so that the finger tips of a first assembly are disposed radially inwards relative to an upstream portion of a second finger bar assembly immediately downstream, so as to assist in clearance of material tending to straddle the fingers.

20. The axial flow rotary separator of claim 17 wherein the rotor includes, and relies on for engagement and circumferential propulsion of crop material, generally radially extending finger-like elements which, as the rotor rotates, relatively penetrate and withdraw from the generally annular mat, defining zones of greater and lesser penetration, and wherein the zone of greater penetration at least partially circumferentially overlaps the grate.

21. A threshing and separating combination including a threshing cylinder rotatable about an axis of rotation and an arcuate concave spaced from and at least partially wrapping the cylinder so as to define a threshing and separating zone between them, characterized in that:
the concave comprises an array of axially extending circumferentially spaced finger bar assemblies, defining collectively an internal arcuate surface of the concave and each finger bar assembly including a plurality of circumferentially extending side by side fingers, having in terms of rotor rotation, upstream and downstream ends, and at least one axial support member having an internal surface and lying substantially within the arcuate surface for supporting the fingers, and wherein there is a generally radially extending gap of significant circumferential extent between the downstream end of each finger and the upstream portion of the immediately adjacent finger bar assembly and wherein in all said finger bar assemblies all fingers are substantially coplanar and extend in the downstream direction.

22. The threshing and separating combination of claim 21 wherein the downstream tip of each finger is offset radially outwards with respect to the upstream portion of the succeeding finger bar assembly.

23. The threshing and separating combination of claim 21 wherein the upstream ends of the fingers are each rigidly attached to the axially extending support member, and the the internal surface of the support member is generally coplanar with the fingers.

24. The threshing and separating combination of claim 21 wherein, in the direction of rotation a first finger bar assembly is followed by a second finger bar assembly and wherein the axial spacing of the fingers of the second finger bar assembly establishes a gap between the fingers, and the fingers of the first finger bar assembly are circumferentially aligned approximately with the gaps of the second finger bar assembly.

25. The threshing and separating combination of claim 21 wherein the threshing cylinder is of the raspbar type.

26. A harvester crop material separator having a rotor and a grate at least partially wrapping the rotor and cooperating with it to define an arcuate separating zone, characterized in that:
the grate comprises a series of independent finger bar assemblies, axially extending and circumferentially spaced, each assembly including, in terms of rotor rotation, a leading finger support bar and, trailing downstream from each support bar, a plurality of crop carrying fingers ending adjacent the immediately downstream finger support bar, all the fingers included in a given finger bar assembly being substantially coplanar and extending in the downstream direction and the fingers being spaced apart axially so as to define, in cooperation with the finger support bars, between each pair of fingers and associated finger support bars, a separating cell opening permitting separated crop material to pass radially outwards, said cells including, for each finger bar assembly, a pair of end cells and a plurality of intermediate cells, intermediate the end cells, the downstream tips of the fingers being circumferentially spaced from the finger support bar of the immediately downstream adjacent finger bar assembly, so that each intermediate separating cell opening has a pair of laterally directed downstream exits and so that material engaged by the finger support bar may pass laterally along said support bar at said exits.

27. The crop material separator of claim 26 wherein there is a generally radial clearance between the rotor and the grate, and wherein the radial clearance of the finger support bars is about the same as the radial clearance of the fingers.

28. The crop material separator of claim 27 wherein, in each finger bar assembly, the radial clearance of a portion of each finger intermediate its ends is greater than the clearance of the rotationally upstream and downstream ends of the finger bar assembly.

29. The crop material separator of claim 26 wherein the fingers are supported cantilever fashion by the support bars.

30. The crop material separator of claim 29 wherein the downstream tips of at least some of the fingers are offset radially with respect to an adjacent finger support bar.

31. In a crop material separator comprising a rotor and an arcuate grate of the cell type, partially wrapping the rotor so as to define a separating zone between rotor and grate, each of the cells of the grate having a rotationally downstream end and being defined by members of a plurality of respectively axially and circumferentially extending grate elements, said elements having radially inward surfaces, said surfaces together defining an arcuate separating surface, characterized in that:
in a plurality of side-by-side cells of the grate all said cells have a pair of opposite laterally directed exits adjacent their downstream ends so that, in operation, crop material may migrate across at least two cells.

32. The crop material separator of claim 31 wherein the axially extending grate elements are substantially continuous and have rotationally upstream sides and the circumferentially extending grate elements are interrupted adjacent the upstream sides of the axially extending members.

33. A threshing and separating combination including a threshing cylinder rotatable about an axis of rotation and an arcuate concave spaced from and at least partially wrapping the cylinder so as to define a threshing and separating zone between them, characterized in that:
the concave comprises an array of axially extending circumferentially spaced concave bars defining collectively an internal arcuate surface of the concave, each concave bar including an axially extending support member having radially inward surface laying substantially within the arcuate surface and a plurality of circumferentially extending side-by-side teeth carried by and extending rotationally downstream from the support bar, each tooth having a radially inward surface and a downstream tip and wherein there is a generally radially extending gap of significant circumferential extent between the downstream tip of each tooth and the rotationally succeeding support member and wherein the downstream tip of each tooth is offset radially outwards with respect to the inward surface of the rotationally succeeding support member.

34. The threshing and separating combination of claim 33 wherein, in each concave bar, the respective inward surfaces of the support member and of each tooth are substantially coplanar.

* * * * *

UNITED STATES PATENT AND TRADEMARK OFFICE
CERTIFICATE OF CORRECTION

PATENT NO. : 4,875,891

DATED : 24 October 1989

INVENTOR(S) : Reed J. Turner et al

It is certified that error appears in the above-identified patent and that said Letters Patent is hereby corrected as shown below:

Column 9, line 36, delete "inches".

Column 10, line 26, delete "rationally" and insert --rotationally--.

Signed and Sealed this

Second Day of April, 1991

Attest:

HARRY F. MANBECK, JR.

Attesting Officer

Commissioner of Patents and Trademarks